(12) United States Patent
Liu

(10) Patent No.: US 8,341,973 B2
(45) Date of Patent: Jan. 1, 2013

(54) OPTIMIZER FOR SINGLE STAGED REFRIGERATION SYSTEMS

(76) Inventor: Mingsheng Liu, Omaha, NE (US)

(*) Notice: Subject to any disclaimer, the term of this patent is extended or adjusted under 35 U.S.C. 154(b) by 637 days.

(21) Appl. No.: 12/653,382

(22) Filed: Dec. 14, 2009

(65) Prior Publication Data
US 2011/0144811 A1    Jun. 16, 2011

(51) Int. Cl.
*F25D 17/00* (2006.01)
*F25B 1/00* (2006.01)
*G01R 21/00* (2006.01)
*G01R 19/00* (2006.01)

(52) U.S. Cl. ............ 62/180; 62/179; 62/228.4; 702/60; 702/64

(58) Field of Classification Search ............ 62/179, 62/180, 228.4, 426, 498; 700/276, 282, 297; 702/60, 64
See application file for complete search history.

(56) References Cited

U.S. PATENT DOCUMENTS

| | | | |
|---|---|---|---|
| 6,778,945 B2 * | 8/2004 | Chassin et al. | 702/188 |
| 2009/0255278 A1 | 10/2009 | Taras et al. | |
| 2011/0144932 A1 * | 6/2011 | Alles | 702/61 |

\* cited by examiner

*Primary Examiner* — Chen Wen Jiang

(57) ABSTRACT

An optimizer for a single staged refrigeration system comprising a speed modulation device, controller, and supply air temperature sensor. The optimizer is intended for modulating the speed of the indoor fan and compressor in existing or new refrigeration systems in settings including but not limited to residential houses/buildings, residential heat pump systems, commercial heat pumps systems, water source heat pumps, and roof top units. The optimizer solves humidity and noise problems in existing systems, reduces peak demand, increases energy efficiency, reduces energy consumption rates, and minimizes compressor failure rates and O&M costs.

20 Claims, 2 Drawing Sheets

OPTIMIZER FOR SINGLE STAGED REFRIGERATION SYSTEMS

CROSS-REFERENCE TO RELATED APPLICATIONS

No

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Technical Field

Embodiments are generally related to single staged refrigeration systems, and more particularly to single staged refrigeration systems used in but not limited to residential air conditioning systems, roof top units, residential and commercial air source heat pumps and water source heat pumps.

2. Discussion of Prior Art

Single staged refrigeration systems are widely used in both residential and commercial buildings. Typical systems maintain single zone room temperatures by staging a compressor on and off. These systems have a supply air fan with ON and AUTO modes of operation. The fan ON mode allows the fan to run continuously regardless of the compressor status. In AUTO mode, the fan status is controlled so that both the compressor and fan turn on and off simultaneously. The refrigeration system is typically comprised of a thermostat and condensing unit, as well as a circulation fan (also called an indoor fan) that functions to supply air to the conditioned space.

Over the years, engineers have worked to improve single staged refrigeration systems. Particular inventive emphasis has focused on minimizing over-sizing during the equipment selection process. Yet because cooling loads and heating loads vary substantially over the operative spectrum, these measures did not solve the excessive indoor humidity and noise levels, high energy consumption rates, and the high cost of compressor replacements and other necessary repairs often associated with the refrigeration systems.

Further development of the variable capacity compressor resulted in a more energy efficient refrigeration system with greater indoor comfort control. In this system, the compressor could modulate the cooling capacity to within a range of 15 to 100 percent.

The above mentioned development in turn led to the creation of a system comprising both a variable capacity compressor and variable frequency drive. In this new system, the fan speed and compressor capacity could be modulated to maintain the zone temperature set point and discharge air temperatures, respectively. Due to high retrofit costs, however, this system is not implemented in the millions of already existing refrigeration systems. Noise levels are still high under partial load conditions as well. US patent application 20090255278 to Lifson and Taras (2005), proposes a single integrated modulation device that controls a condenser fan, compressor, and indoor fan or, alternatively, three separate modulation devices that each control one of the three previously stated devices (condenser fan, compressor, and indoor fan at the same speed. Results from lab experiments conducted by the inventor of the proposed application suggests that modulating the condenser fan at the same speed as the compressor and indoor fan will result in a 20+ energy penalty under most operating conditions. The optimizer proposed in the following application utilizes a single modulation device to control only an indoor fan and compressor and is, therefore, more energy efficient than the device proposed by Lifson and Taras.

SUMMARY OF THE INVENTION

The following summary of the invention is provided to facilitate an understanding of some of the innovative features unique to an embodiment of the present invention and is not intended to be a full description. A full appreciation of the various aspects of the invention can be gained by taking the entire specification, claims, drawings, and abstract as a whole.

Accordingly, it is one aspect of an embodiment of the present invention to integrate the modulation and control devices for the indoor fan and compressor into a single, more cost efficient optimizer that can be readily implemented in new and existing single-staged refrigeration systems in settings including but not limited to residential air conditioning systems, residential and commercial heat pump systems, water source heat pump systems, and roof top units.

It is another aspect of an embodiment of the present invention to resolve humidity problems and noise pollution in buildings that have single staged refrigeration systems currently in use.

It is a further aspect of an embodiment of the present invention to prevent liquid sludge related compressor damage as well as minimize motor failure.

It is yet a further aspect of an embodiment of the present invention to maintain adequate humidity control, thermal comfort levels, maintenance and repairs, and short cycling elimination for both new and existing refrigeration systems.

In one embodiment, a method of modulating the speed of the indoor fan and compressor for a single staged refrigeration system that includes a speed modulation device and air supply temperature sensor is provided. Power derived from the power source of an existing refrigeration system or building may be used to power the indoor fan and compressor. The speed modulation device sends power values and current information to the controller to determine the system activity status. The controller identifies the system mode based on the power values and supply air temperature information. System modes include heating, cooling, ventilation/cycling, and auxiliary heating modes. Cooling and heating loads are identified based on the fan speed and supply air temperature patterns. The load information is used to modulate the speed of the indoor fan and compressor.

In another embodiment, an optimizer for a single staged refrigeration system comprising a motor speed modulation device, a supply air temperature sensor, and controller is provided. The speed modulation device collects power output and current values from an existing power source and converts them to the frequency needed to operate the fan and compressor at a predetermined speed. The controller of the optimizer sends speed commands to and receives supply air temperature and power output values from the speed modulation device. The supply air temperature measuring device supplies air temperature values to the controller. The controller determines the activity status of the indoor fan and compressor based on the collected power output and current values and identifies the system mode based on the collected supply air temperature and power output values.

In both embodiments the controller identifies possible faults including (but not limited to) issues involving low charge in the compressor, compressor leakage, dirty coils, and fan belt loss. Since system faults are reported and detected, there is a reduction in compressor and fan failure rates, on and off cycling rates, and O&M costs. Starting the compressor at a low speed maintains a stable motor winding temperature and reduces the inrush current by more than half. Further, motor failure is minimized and liquid sludge related compressor damage prevented. The optimizer applies (but is not limited) to rotary, scroll, screw, and reciprocating compressors. Compressor noise is reduced under partial load conditions to lower the noise levels.

Notably, the method and system disclosed herein provides a feasible solution for retrofitting existing systems or those systems that are currently implemented in approximately over 50% of building spaces. However, the disclosed optimizer can also be implemented in new systems as well. Due to an energy penalty when moisture is removed from a building, the higher the already existing relative humidity levels, the lower the expected percent energy savings. The optimizer can help reduce peak demand by approximately 30% to 70% depending on the sizing and over-sizing of existing systems. It may also increase system energy by approximately 50%, and reduce energy consumption rates by approximately 20% to 50% according to the seasonal load profile and existing room humidity conditions.

The above-described features and advantages of the present disclosure thus improve upon those systems and methods in the prior art designed to provide cooling and heating to a single zone using a single staged refrigeration system.

DRAWINGS REFERENCE NUMERALS

101 Power Source
102 Speed Modulation Device
103 & 105 Existing Relays
104,106,113,114 Power lines
107 Compressor
108 Fan
109 Temperature Sensor
110 Controller
112 Supply Duct Work
201 Speed Modulation Module
202 Fault Detection Module

DESCRIPTION OF THE PREFERRED EMBODIMENT

The particular values and configurations discussed in these non-limiting examples can be varied and are cited merely to illustrate an example of at least one embodiment of the present invention and are not intended to limit the scope of the invention. Also, it is understood that the phraseology and terminology used herein is for the purpose of description and should not be regarded as limiting. The use of "including," "comprising," and variations thereof herein is meant to encompass the items listed thereafter and equivalents thereof as well as additional items. Unless specified or limited otherwise, the terms "mounted," "connected to," "attached to," and variations thereof are used broadly to encompass both direct and indirect mountings, connections, and supports.

Figure 1:
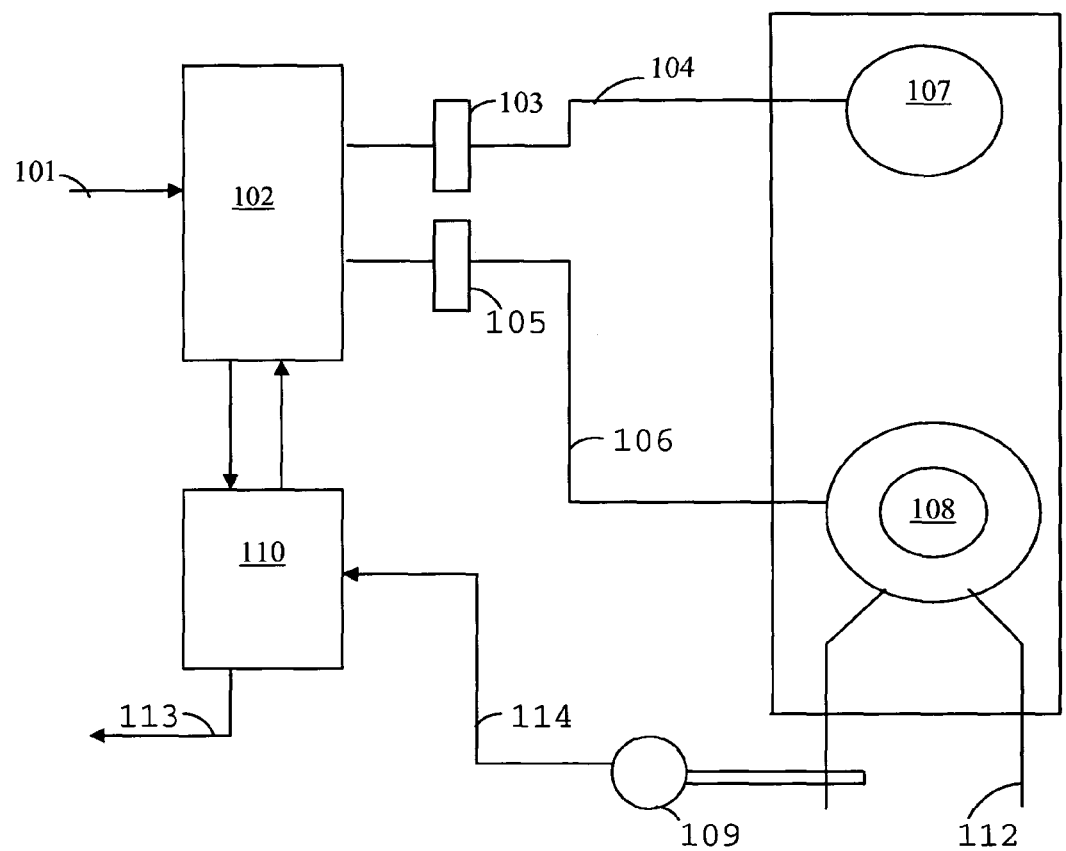
FIG. 1 is a diagram of the system embodying the principles of the invention used for single staged refrigeration systems.

FIG. 1 shown below illustrates an embodiment of an optimizer. Power for running the optimizer is derived from existing power source 101, which can be either single or three phase depending on the voltage and frequency. Examples of possible voltages and frequencies are 110, 208, and 480 volts at frequencies of 50 and/or 60 Hz. Speed modulation device 102 converts the source power to the frequency required to modulate the speed of compressor 107 and fan 108. This required frequency is generated by controller 110. Speed modulation device 102 powers compressor 107 and fan 108 by way of power lines 104 and 106.

Existing relays 103 and 105 from the existing refrigerator system may be interconnected along power lines 104 and 106 so that they lie between compressor 107, fan 108, and speed modulation device 102. Relays 103 and 105 start and stop the fan and compressor based on the control schedule of the existing refrigeration system. As an option, an existing room thermostat not illustrated in the figure may also be used to start and stop indoor fan 108 and compressor 107. This thermostat determines the system mode based on the room temperature set point. If the room temperature is higher than the predetermined set point, for example, then fan 108 and compressor 107 activate.

Controller 110 receives supply air temperature signals from temperature sensor 109. Temperature sensor 109 can be attached to the fan by supply duct work 112. Power related data including (but not limited to) the power factor, torque, input and output currents, voltages, and frequencies are sent to controller 110 from speed modulation device 102. Controller 110 records historical data, identifies the system mode, building loads, and system faults, communicates with upper level controllers, generates the speed modulation command, and relays that command to speed modulation device 102. Controller 110 can also be linked with other controllers.

Figure 2:
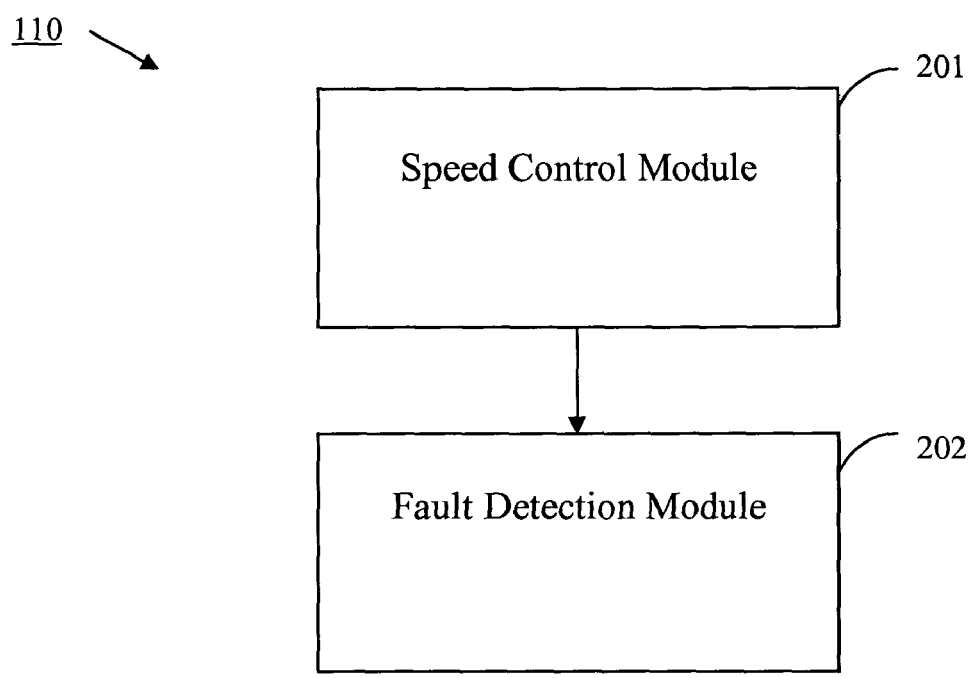
FIG. 2 is a flowchart showing the decision-making processes of the control device of the system embodying the principles of the invention used for single staged refrigeration systems.

FIG. 2 shown below illustrates the decision making processes of controller 110. Controller 110 is comprised of speed modulation module 201 and fault detection module 202. Speed modulation module 201 makes control decisions using supply air temperature data, current speed modulation output data, and information based on the actual current or power. Fault detection module 202 detects and reports system faults. As an option, other controllers may be linked to controller 110 by power line 113. Power line 114 connects temperature sensor 109 to controller 110. Supply duct work 112 connects temperature sensor 109 to fan 108.

Controller 110 indirectly identifies the activity status of fan 108 and compressor 107 using power output and current values (either the actual power or actual current) collected through communication with speed modulation device 102. Minimum current and power values for fan 108 and compressor 107 are determined using differing frequencies.

The current and/or power values determine the activity status of fan 108 and compressor 107. When both fan 108 and compressor 107 are inactive, the current and/or power values are lower than the predefined minimum fan current and/or power values of fan 108. If the current and/or power values are greater than the predefined minimum current and/or power values for fan 108, yet less than the predefined minimum current and/or power values of fan 108 and compressor 107 combined, then only fan 108 is active. On the other hand, if the current and/or power values are greater than the predefined minimum current and/or power values of fan 108 and compressor 107 combined, then both compressor 107 and fan 108 are active. During the time that compressor 107 is inactive, controller 110 commands the output of speed modulation device 102 at a minimum predefined speed. (Within a time period of approximately 5 minutes for example).

Heating and cooling modes are determined by supply air temperature values. When compressor 107 is active, supply air temperature values are read in approximately a few seconds or shorter interval. Data is smoothed using a moving average (10 data can be used for example). The temperature is then recorded and updated in a predefined time period (every 10 minutes for example).

The following describes methods of operating the optimizer in different settings. When the optimizer is applied to a heat pump system, heating mode starts when the average supply air temperature is greater than a predetermined value. When the auxiliary electrical heating system mode is active, the heat pump is set at a maximum speed. The status of the electrical heater is detected using information on the system modulation speed, power values, and supply air temperature values. Cooling mode starts when the average supply air temperature is lower than a predetermined value. As an example, heating mode may start when the supply air temperature reaches approximately 75° F. and after the compressor runs for at least 5 minutes. Following this same example, if the supply air temperature is less than approximately 70° F. after the compressor is active for at least 5 minutes, the system is considered to be in the cooling mode.

When the optimizer is applied to a roof top unit, cooling mode starts upon activation of compressor 107. If the supply air temperature is higher than a predetermined value (for example at approximately 85° F.), the system is considered to be in the heating mode.

The following details the procedure for determining the output of speed modulation device 102. During the period of operation that follows the predefined start-up period (called the normal mode), modulate compressor 107 at a minimum speed for τ (10) minutes in the heating mode. Record the average supply air temperature at the first half time ($T_{sa1}$) as well as the average supply air temperature at the second half time ($T_{sa2}$). The output of speed modulation device 102 may then be determined using the equation:

$$Spd=\min(spdMax, \max(spdMin, (currentSpd-\beta(T_{sa1}-T_{sa2}))))$$

where Spd represents the percent speed assigned to speed modulation device 102, currentSped represents the current speed of speed modulation device 102, spdMin represents the lowest compressor speed limit, spdMax represents the highest speed limit of speed modulation device 102, β represents the modulation ratio (Ranges from 1 to 10, 4 is recommended).

When the fan signal is off, the VFD is at a minimum speed. In ventilation mode, set the VFD at the minimum speed.

The optimizer identifies both the compressor and fan faults using patented technologies disclaimed in previous patents. The programming of control device 110 is not detailed in this disclosure but is known to a person of ordinary skill in the art.

What is claimed is:

1. A method for modulating the speed of an indoor fan and compressor for a single staged refrigeration system including a speed modulation device and supply air temperature sensor, the method comprising:
    providing a power source in proximity to said speed modulation device;
    converting said power source to a frequency for powering said fan and compressor at a predetermined speed;
    determining the activity status of said indoor fan and compressor based on said power and current values from said speed modulation device;
    determining the system mode of said indoor fan and compressor based on said supply air temperature values and said power values.

2. The method of claim 1, wherein determining said activity status of said indoor fan and compressor further comprises determining the relationship of said current and power values of said indoor fan and compressor with predetermined minimum current and power values of said fan and compressor.

3. The method of claim 1, wherein determining said activity status of said indoor fan and compressor further comprises determining the relationship of said current and power values of said indoor fan and compressor with a predetermined minimum current and power value of said indoor fan and compressor, whereby said activity status of said indoor fan and compressor is inactive when said current and power values of said indoor fan and compressor are lower than said predefined minimum current and power values; said activity status of said indoor fan and compressor is active when said current and power values are greater than said predetermined minimum current and power values; said activity status of only said indoor fan is active when said current and power values are greater than said predetermined minimum current and power values for said fan but less than said predetermined minimum current and power values for said indoor fan and compressor combined.

4. The method of claim 3, wherein determining said activity status of said indoor fan and compressor further comprises determining the relationship of said current values with predetermined minimum current and power values from said indoor fan and compressor.

5. The method of claim 3, wherein determining said activity status of said indoor fan and compressor further comprises determining the relationship of said power values with a predetermined minimum current and power value of said indoor fan and compressor.

6. The method of claim 1, wherein said system mode is further comprised of a heating mode, cooling mode, ventilation/cycling mode, and auxiliary heating mode.

7. The method of claim 6, wherein said heating mode and cooling mode is further determined following the steps comprising:
    activating said compressor;
    reading said supply air temperature values in a predetermined time period;
    smoothing said supply air temperature values using a moving average;
    updating and recording said supply air temperature values within a predetermined time period.

8. The method of claim 7, wherein determining said heating and cooling modes of said fan and compressor for a heat pump unit further comprises the step of determining the relationship of said supply air temperatures values with a predetermined value whereby said heating mode starts when the average of said air supply temperatures is higher than said predetermined value, and said cooling mode starts when the average of said air supply temperatures is lower than said predetermined value.

9. The method of claim 1, wherein determining the output of said speed modulation device further comprises solving a speed modulation equation comprising the steps of:
- modulating said compressor at minimum speed in heating mode;
- recording an average of said supply air temperature values at a first halftime and an average of said supply air temperature values at a second half time;
- inputting said supply air temperature values at said first half time and said second half time into said speed modulation equation.

10. An optimizer for modulating the speed of a fan and compressor for a single staged refrigeration system using an existing power source, said optimizer comprising;
- a speed modulation device in proximity to said existing power source and linked with said indoor fan and compressor, said speed modulation device configured to collect power and current values from said existing power source and convert said existing power source to a frequency for powering said fan and compressor at a predetermined speed;
- a supply air temperature measuring device linked with said fan and operable to measure supply air temperature values;
- a control system in signal communication with said speed modulation device and supply air temperature measuring device, said control system configured to send power commands to and receive said power and current values from said speed modulation device and said supply air temperature values from said supply air temperature measuring device and, based on said power and current values determine the activity status of said indoor fan and compressor, and based on said supply air temperature values and power values determine the system mode of said indoor fan and compressor.

11. The optimizer of claim 10, wherein said power source is derived from an existing system.

12. The optimizer of claim 11, wherein said existing system further comprises a plurality of relays positioned between said fan, compressor, and speed modulation device and operable to start and stop said indoor fan and compressor according to a control schedule of said existing system.

13. The optimizer of claim 10, wherein said power source is three phase.

14. The optimizer of claim 10, wherein said power source is single phase.

15. The optimizer of claim 10, wherein said control system may be linked in communication with at least one other control system.

16. The optimizer of claim 10, wherein said control system further comprises a plurality of modules including a speed modulation module and fault detection module, said speed modulation module operable to make control decisions based on said supply air temperature values and power and current values, said fault detection module operable to detect system faults.

17. The optimizer of claim 10, wherein said system mode further comprises a heating mode, cooling mode, ventilation/cycling mode, and auxiliary heating mode.

18. The optimizer of claim 17, wherein said heating mode for a heat pump system occurs when an average of said supply air temperature values are above a predetermined value, and wherein said cooling mode occurs when an average of said supply air temperature values are below a predetermined value.

19. The optimizer of claim 17, wherein said heating mode for a roof top unit occurs when an average of said supply air temperature values are above a predetermined value, and wherein said cooling mode occurs when said compressor activates.

20. The optimizer of claim 10, wherein said activity status of said indoor fan and compressor is determined when said power output and current values are higher or lower than a predetermined minimum power and current value.

* * * * *